United States Patent [19]

Oetiker

[11] 4,357,037
[45] Nov. 2, 1982

[54] HOSE COUPLING

[76] Inventor: Hans Oetiker, Oberdorfstrasse 21, CH-8810 Horgen, Switzerland

[21] Appl. No.: 229,065

[22] Filed: Jan. 28, 1981

[51] Int. Cl.³ .............................................. F16L 37/10
[52] U.S. Cl. .................................. 285/314; 285/317; 403/322
[58] Field of Search ....... 285/317, 314, 313, DIG. 22, 285/308, 310; 403/322, 325

[56] References Cited

U.S. PATENT DOCUMENTS

| | | | |
|---|---|---|---|
| 464,386 | 12/1891 | Patterson | 285/314 |
| 592,899 | 11/1897 | Wilson | 285/314 |
| 2,152,375 | 3/1939 | Crowley | 285/317 |
| 2,449,920 | 9/1948 | Williams | 285/314 |
| 2,478,052 | 8/1949 | Palm | 285/314 |
| 3,351,359 | 11/1967 | Ferraris | 285/314 X |
| 4,025,049 | 5/1977 | Schmidt | 285/317 X |
| 4,225,162 | 9/1980 | Dola | 285/DIG. 22 X |

FOREIGN PATENT DOCUMENTS 2442393  6/1980  France ............................... 285/314
 414280 12/1966  Switzerland ........................ 285/317

Primary Examiner—Thomas F. Callaghan
Attorney, Agent, or Firm—Paul M. Craig, Jr.

[57] ABSTRACT

An arrangement for locking a male connecting member adapted to be inserted into a bore of a coupling member in which the female coupling member is provided with two cutouts generally at right angle to each other, of which one breaks through a portion of the wall forming the bore; a locking member of sheet-metal material is loosely inserted into the one cutout whereupon a spring is loosely placed over the locking member to urge the locking member inwardly, and a cap-like member is mounted over the female coupling member which covers externally the cutouts and holds the spring in place in prestressed condition.

26 Claims, 6 Drawing Figures

HOSE COUPLING

The present invention relates to a locking arrangement for a coupling of the type, in which a connecting nipple is adapted to be axially secured within the bore of the female coupling member by the use of a spring ring or the like.

Locking arrangements of the type described above are known as such in the prior art, as disclosed, for example, in my prior Swiss Pat. No. 397,358 in which the straight portion of a spring ring, extending chord-like through a milled-out recess, is adapted to engage into an external annular groove in the connecting nipple when the latter is inserted into the bore of the coupling member. For purposes of enabling disconnection, a rotatable ring member itself provided with an actuating member in the form of a spring ring or screw, engages the free end of the straight portion of the spring ring when rotated in the appropriate direction so as to lift the straight portion out of the annular groove and thereby enable disengagement of the connecting nipple from the female coupling member.

While couplings of the type described in my aforementioned Swiss patent proved commercially very successful because of their excellence in performance, they also entailed certain drawbacks as regards manufacture and assembly. More particularly, the parts of this type of prior art couplings not only involved relatively high manufacturing costs, but also were relatively costly to assemble. All prior attempts by me to obviate these shortcomings and drawbacks could be deemed, at best, only moderately successful. Moreover, other prior art couplings, based on the same principle of operation such as the U.S. Pat. No. 794,110 to McDowell, the U.S. Pat. No. 2,805,089 to Hansen, the Danish Pat. No. 75,910 to Hansen, the British Pat. No. 480,959 to Smith et al., and the Italian Pat. No. 566,359 to High Pressure Components, Ltd. entail the same shortcomings and disadvantages as regards ease of manufacture and assembly.

With ever-increasing labor and material costs, the success in the marketplace of any product is frequently dependent on its price competitiveness, taking into consideration its performance characteristics which, in case of a coupling, also involve considerations of energy savings in operation.

The present invention is concerned with the primary task to provide a locking arrangement of the type described in my prior Swiss Pat. No. 397,358 which assures the same high performance standards, yet permits a significant reduction in the costs of manufacture and assembly.

Another drawback in the prior art couplings of this type resided in the dependence of the external dimensions of both the connecting nipple and the female coupling member on the diametric dimension of the fluid line reflected by the internal bore of the connecting nipple. In other words, for connecting nipples with larger external diameters, female coupling members of larger external diameters were normally necessary. Accordingly, another important object of the present invention resides in a coupling of the aforementioned type permitting far-reaching standardization of the parts by the use of female coupling members having the same external dimensions for connecting nipples of widely varying external diameters.

The underlying problems are solved according to the present invention with a locking arrangement for a coupling of the type described above in that the female coupling member is provided with two cutouts formed by two recesses milled into the female coupling member substantially at right angles to each other, of which one breaks through the wall of the coupling member to provide a direct communication with the internal bore of the female coupling member, in that a locking or latching member of flat sheet metal material is inserted into the milled-out recess intersecting the internal bore of the coupling member and in that the sheet-metal locking or latching member is spring-loaded inwardly by a coil spring placed on the outside of the sheet-metal locking or latching member and is held in place by a rotatable cap-like member. No mechanical connection exists thereby between the latching member, the spring, and the cap-like member.

According to a particularly advantageous construction of the present invention, the cap-like member is made of any suitable plastic material and includes one or two inwardly directed entrainment projections formed in one piece with the cap-like member. Additionally, the plastic cap-like member thus constructed is provided with an annular bead-like enlargement or with circumferentially spaced bead-like enlargements near the free axial end thereof which are adapted to engage by snap-action into a circumferential groove provided in the outer surface of the female coupling member so as to fasten the cap-like member rotatably with respect to the female coupling member in a readily detachable manner.

Since the cap-like member with its inwardly projecting actuating parts can be readily made by any known process using plastic materials, such as suitable molding processes with the use of appropriate synthetic resinous materials, since the female coupling member only requires two recesses, milled-in at substantially right angle by simple machining operations, and since the locking arrangement basically includes only three parts; namely, the substantially flat sheet-metal latching member, the coil spring, and the cap-like member, ease of manufacture of the locking arrangement is assured by the present invention. Furthermore, since the sheet-metal latching member is merely loosely placed into the milled-out recess and since the coil spring is merely loosely placed against the back side of the sheet-metal latching member and can be manually compressed when the cap-like member is slipped over the same which itself is fastened by snap-in action, ease of assembly is also assured by the locking arrangement according to the present invention.

To use a female coupling member with the same external dimensions for male connecting members of larger size couplings, it is only necessary in the arrangement of the present invention to replace the flat sheet-metal latching member of generally planar configuration with a flat sheet-metal latching member of approximately L-shaped configuration and to omit one inwardly projecting entrainment member so as to permit displacement of the locking or latching member away from the axis of the coupling to thereby accommodate larger size connecting nipples with the remainder of the external dimensions of the parts remaining the same. In practice, cross-sectional area ratios greater than 2:1 can be accommodated with female coupling members having the same external configuration by the use of the locking arrangement in accordance with the present invention.

Still another feature of the present invention resides in a locking arrangement for a coupling in which the female coupling member is normally closed by a valve structure until the connecting nipple is inserted into place. The ever-increasing costs of energy require an energy consciousness not only as regards manufacturing costs, but also as regards energy-saving performance of such product in actual operation. The locking arrangement of the present invention which avoids unnecessary losses in the pressure lines, satisfies these requirements in an excellent manner.

These and other objects, features and advantages of the present invention will become more apparent from the following description when taken in connection with the accompanying drawing which shows, for purposes of illustration only, two embodiments in accordance with the present invention, and wherein.

Figure 1:
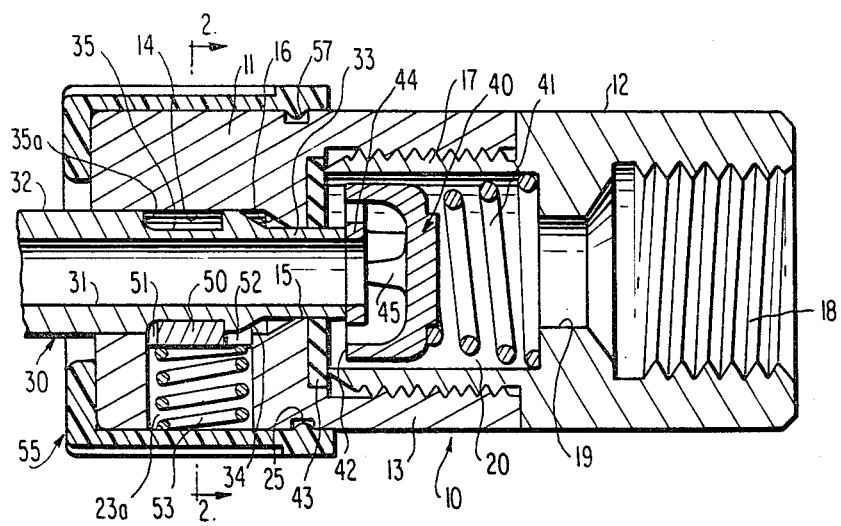
FIG. 1 is an axial, longitudinal cross-sectional view through a locking arrangement for a coupling in accordance with the present invention, taken along line I—I of FIG. 2.

Referring now to the drawing wherein like reference numerals are used throughout the various views to designate like parts, reference numeral 10 generally designates therein a two-partite female coupling member consisting of a left coupling part 11 and of a right coupling part 12 which are threadably secured together by the internally threaded portion provided in the external sleeve-like extension 13 of left coupling part 11 and the externally threaded portion of the sleeve-like extension 17 of right coupling part 12. The left coupling part 11 is provided with an internal bore 14, the diameter of which is related to the size of the male coupling member or connecting nipple it can accommodate. Bore 14 in the coupling part 11 is connected with the reduced bore section 15 by way of the tapered bore section 16. The right coupling part 12 is provided with a threaded connecting bore 18 for connection with the pressure line and leads to chamber 20 formed within extension 17 by way of bore 19 of reduced diameter. As can be seen best in FIG. 2, the coupling part 11 is also provided with two recesses 23a and 23b milled in at right angle into the coupling part 11, of which the milled-in recess 23a intersects with its imaginary chord the internal bore 14, i.e., breaks through the wall of the coupling part 11 to provide a direct communication between the inside of the bore 14 and the milled-out recess 23a. Additionally, the left coupling part 11 is provided with an annular groove 25 for purposes to be explained hereinafter.

The male coupling member or connecting nipple generally designated by reference numeral 30 is provided with an internal bore 31 for conducting therethrough the medium under pressure and includes a first portion 32 of larger diametric dimensions which terminates in an end portion of reduced diametric dimension 33 by way of a tapered section 34. Additionally, the male coupling member 30 is provided with a circumferentially extending groove 35 at such location that it will be in substantial axial alignment with the milled-in recess 23a when the connecting nipple 30 is in its engaged position. The circumferentially extending groove 35, as can be seen best in FIG. 1, forms a substantially right angle between its forward end surface and bottom surface of the groove 35 while its rear end surface passes over into the bottom surface by way of a rounded-off portion 35a.

To keep the pressure line (not shown), which is normally connected with the female coupling member 10, closed when no connecting nipple 30 is inserted and thereby avoid energy losses, a valve member generally designated by reference numeral 40 is provided within the chamber 18 which is urged into its closing position by spring 41 in such a manner that the annular sealing surfaces 42 thereof engage the gasket 43 suitably seated in a corresponding recess provided in the female coupling part 11. An annular actuating disk 44 integral with the valve structure 40, for example, by way of support ribs 45, is adapted to be engaged by the free end face of the connecting nipple 30 when the latter is inserted into the bore 14 of the left coupling part 11 so as to open the valve structure 40 when the connecting nipple 30 reaches its engaged, locked position.

The locking arrangement in accordance with the present invention basically involves only three parts; namely, the locking or latching member 50 (FIG. 3) which is made from flat sheet-metal material and is basically rectangular, a coil spring 53, and a cap-like member generally designated by reference numeral 55 made of any suitable plastic material. For ease of assembly of the male connecting member 30 with the female coupling part 10, the locking member 50 is provided with an approximately V-shaped notch 51 in its rear end face, as viewed in the inserting direction of the connecting nipple, while its opposite forward end face is provided with a flattened, approximately U-shaped cutout 52 to assure secure locking of the parts 10 and 30.

Two inwardly projecting entrainment members 56a and 56b as also a bead-like annular enlargement or spaced enlargements 57 are formed in one piece with the cap-like member 55 by being molded integrally therewith. The serrated or knurled external configuration 59 of the cap-like member 55 is also readily feasible by the use of an appropriate mold.

For purposes of assembly, it is only necessary to place the locking or latching member 50 loosely into the milled-out recess 23a, then place the spring 53 loosely against the back surface of the latching member 50 and thereafter compress the spring 53, for example, with the thumb, while the cap-like member 55 is slipped over the outside surfaces of the left coupling part 11 until its bead-like enlargement 57 snaps into the annular groove 25, thereby securely fastening the cap-like member 55 in a readily detachable manner to the left coupling part 11.

Figure 2:
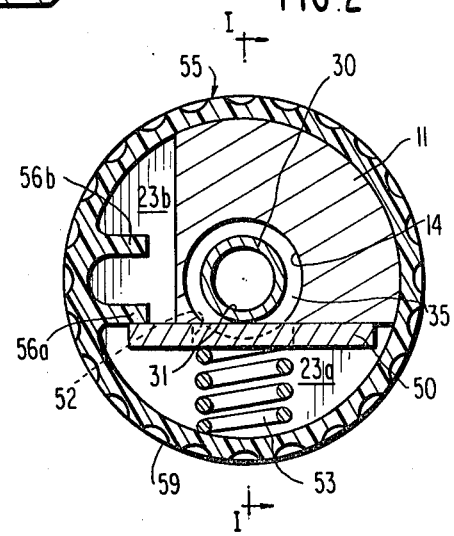
FIG. 2 is a transverse cross-sectional view through the locking arrangement in accordance with the present invention, taken along line II—II of FIG. 1.
Figure 4:
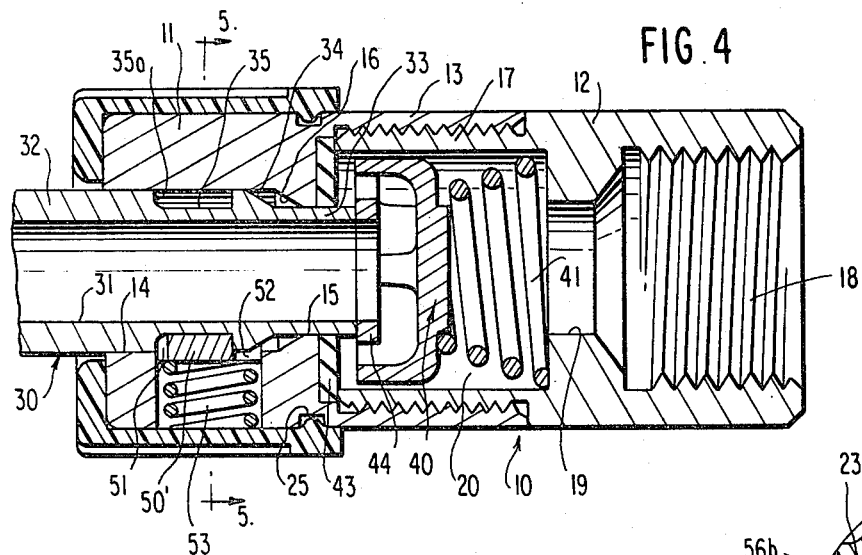
FIG. 4 is an axial longitudinal cross-sectional view, similar to FIG. 1, showing the locking arrangement in accordance with the present invention when used with a connecting nipple of larger diametric dimensions, with the cross section being taken along line IV—IV of FIG. 5.
Figure 5:
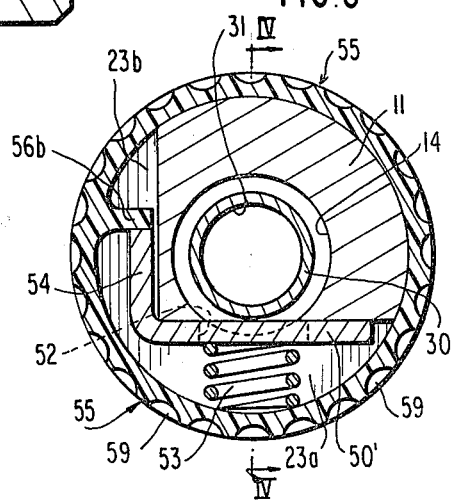
FIG. 5 is a transverse cross-sectional view, taken along line V—V of FIG. 4.
Figure 6:
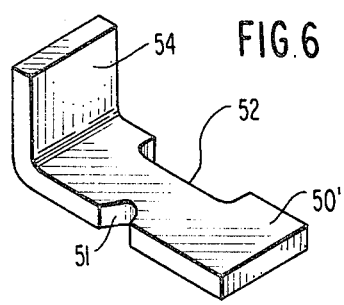
FIG. 6 is a perspective view of the L-shaped sheet-metal locking member in accordance with the present invention used in the locking arrangement of FIGS. 4 and 5.

The parts of the coupling are shown in the locked, connected condition in FIGS. 1 and 2 in which the spring-loaded locking member 50 engages securely in annular groove 35. In order to disengage the connecting nipple 30, it is only necessary to rotate the cap-like member 55 in the counterclockwise direction as viewed in FIG. 2, in which case the entrainment member 56a engages with the left free end of the locking member 50, lifting it out of the groove 35 against the force of spring 53 and therewith enabling disconnection of the connecting nipple 30. With appropriate selection of the type of material and thickness, the entrainment member 56b may function as elastic abutment during rotation of the cap-like member 55 in the clockwise direction and additionally assumes the function of entrainment member when the entrainment member 56a is omitted with a larger connecting nipple as shown in FIGS. 4 and 5, in which case a locking or latching member 50' made of flat sheet-metal material and bent into approximately L-shape is used, as shown in FIGS. 5 and 6. In that case, counterclockwise rotation of the cap-like member 55 will cause engagement of the entrainment member 56b with the free end of the short leg 54 of the L-shaped latching member 50', causing the same to lift out of the annular groove 35 to permit disconnection of the connecting nipple 30.

Figure 3:
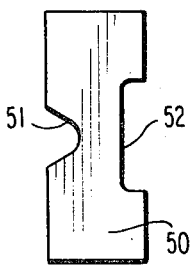
FIG. 3 is an elevational view of the planar sheet-metal locking member according to the present invention as used in the embodiment of FIGS. 1 and 2.

As to the rest, the embodiment of FIGS. 4-6 is similar to that of FIGS. 1-3 and operates in the same manner. Both locking members 50 and 50' are made from flat sheet-metal stock by simple punching-out or stamping-out operations providing also notches 51 and cutouts 52. Moreover, as can be readily recognized, the external dimensions of the female coupling member 10 of FIGS. 4 and 5 can be kept the same as in FIGS. 1 and 2 as also the dimensions of the cap-like member 55 thereof except for the elimination of one of its entrainment members. Standardization is also possible insofar as spring 53 is concerned.

It is readily apparent from the foregoing that the locking arrangement in accordance with the present invention is extremely simple to manufacture and to assemble. Additionally, the locking arrangement according to the present invention permits ready accommodation of connecting nipples of different diameters over a relatively wide cross-sectional area ratio exceeding the ratio of 2:1. Furthermore, standardization of the parts is far-reachingly possible. Finally, by using plastics material of different color, readily realized by different color additives to the same basic material, the use of the coupling can be made easily recognizable, e.g., blue for compressed air, red for oxygen, etc.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A locking arrangement for a coupling in which a male coupling member provided with an external annular groove is adapted to be inserted into a bore of a female coupling member whose bore is in direct communication with the outer surface of the female coupling member by way of a cutout whose imaginary chord-like inner end intersects said bore, and which includes locking means for holding the male coupling member in its connected position relative to the female member with said cutout in substantial axial alignment with said external annular groove and normally operable to effect a locking action by extending through said cutout into said annular groove, and rotatable means on said female coupling member operable to engage with said locking means for withdrawing said locking means from said external annular groove to enable disengagement of said male coupling member from said female coupling member, characterized in that said locking means includes a separate locking member loosely inserted into said cutout, in that said rotatable means includes a rotatable cap-like member externally covering said locking member and cut-out and an actuating means integral with said cap-like member and operable to engage with one end of said locking member, and in that a compressible spring is provided between said locking member and said cap-like member which is located within said cut-out and is compressed by its engagement with the inner surface of said cap-like member and the outer surface of said locking member so that said spring urges said locking member into its locking position.

2. A locking arrangement according to claim 1, characterized in that said cap-like member and actuating means are in one piece of plastic material.

3. A locking arrangement according to claim 2, characterized in that said cap-like member is provided near its axially free end with radially inwardly extending, bead-like means operable to enage by snap-in action into a circumferential groove provided in said female coupling member to fasten said cap-like member in a rapidly detachable manner relative to said female coupling member.

4. A locking arrangement according to claim 3, in which said actuating means is formed by at least one generally inwardly extending entrainment member operable to engage with said one end of the locking member.

5. A locking arrangement according to claim 4, characterized in that said cap-like member has axially grooved external surfaces.

6. A locking arrangement according to any one of claims 1, 2, 3, 4, or 5, characterized in that said cap-like member and actuating means constitute a one-piece integrally molded synthetic resinous part.

7. A locking arrangement according to claim 6, characterized in that the entrainment member of said actuating means has a limited elasticity to enable limited elastic deflections.

8. A locking arrangement according to any one of claims 1, 2, 3, 4, or 5, characterized in that the device producing the locking action includes only of the three separate parts consisting of said rotatable means, said locking member, and said spring devoid of any mechanical connection therebetween.

9. A locking arrangement according to claim 8, characterized in that said cap-like member and actuating means constitute a one-piece integrally molded synthetic resinous part.

10. A locking arrangement which can be used for male coupling members of different diameters with female coupling members of the same external dimensions according to claim 6, characterized in that for male coupling members of larger outside diameter, said locking means is a sheet-metal member of approximately L-shape while for coupling male coupling members of smaller diametric dimensions, said locking means is in the shape of a substantially planar sheet-metal part.

11. A locking arrangement according to claim 10, characterized in that for male coupling members of smaller diametric dimensions, said actuating means includes two inwardly projecting entrainment members, while for male coupling members of larger diametric dimensions only one inwardly projecting entrainment member is provided in said cap-like member.

12. A locking arrangement according to claim 1, characterized in that said locking member is a generally rectangular punched-out sheet metal part having opposite, generally flat surface portions, one of said generally flat surface portions facing inwardly in the direction of said bore and the other of said generally flat surface portions facing outwardly and forming an abutment surface for said compressible spring.

13. A locking arrangement according to claim 12, characterized in that said generally rectangular part has a width complementary to, but slightly less than, the width of said cut-out to permit free movement of said locking member in said cut-out.

14. A locking arrangement according to claim 6, characterized in that said locking member is a generally rectangular punched-out sheet metal part having opposite, generally flat surface portions, one of said generally flat surface portions facing inwardly in the direction of said bore and the other of said generally flat surface portions facing outwardly and forming an abutment surface for said compressible spring.

15. A locking arrangement according to claim 14, characterized in that said generally rectangular part has a width complementary to, but slightly less than, the width of said cut-out to permit free movement of said locking member in said cut-out.

16. A locking arrangement for a coupling in which a male coupling member provided with an external annular groove is adapted to be inserted into a bore of a female coupling member whose bore is in direct communication with the outer surface of the female coupling member by way of a cutout whose imaginary chord-like inner end intersects said bore, and which includes locking means for holding the male coupling member in its connected position relative to the female member with said cutout in substantial axial alignment with said external annular groove and normally operable to effect a locking action by extending through said cutout into said annular groove, and rotatable means on said female coupling member operable to engage with said locking means for withdrawing said locking means from said external annular groove to enable disengagement of said male coupling member from said female coupling member, characterized in that said locking means includes a stamped-out, generally flat sheet metal locking member loosely inserted into said cut-out, in that a second cut-out is provided in said female member which intersects with said first-mentioned cut-out, in that said rotatable means includes a rotatable cap-like member externally covering said two cut-outs and an actuating means integral with and projecting inwardly from said cap-like member, said actuating means being operable to move in said second cut-out during rotation of said cap-like member to engage with one end of said locking member and in that a compressible spring is provided directly between the inner surface of said cap-like member and the outwardly facing surface of said locking means which urges the locking member into its locking position.

17. A locking arrangement according to claim 16, characterized in that said two cut-outs are disposed generally at right angle to each other and in that the three parts consisting of locking member, spring and cap-like member are retained in their assembled condition devoid of any mechanical connection therebetween.

18. A locking arrangement according to claim 16 or 17, characterized in that said cap-like member and actuating means are in one piece of plastic material.

19. An arrangement for locking a male connecting member adapted to be inserted into a bore of a female coupling member, characterized in that the coupling member is provided with two mutually intersecting cutout portions disposed generally at right angle to each other, one of said cutout portions also intersecting and breaking through a portion of the wall forming said bore to provide a direct communication between said bore and the outside of said female coupling member, a latching member loosely inserted into said one cutout portion, a spring loosely placed over said latching member and operable to urge the latter inwardly, and cap means on said female coupling member, said cap means externally covering said cutout portions and said spring and holding said spring in place in the stressed condition thereof wherein said cap means fulfills the triple functions (a) of cover for said spring and said latching member, (b) of release means for releasing the locking action by an entrainment member formed integrally with said cap means and operable to engage with said latching member and (c) of external protection of the release means.

20. An arrangement according to claim 19, characterized in that the cap means essentially consists of plastic material and includes an integrally formed inwardly projecting entrainment part operable to move in said other cut-out portion during rotation of said cap means, and bead-like means near its free axial end to enable fastening thereof to said female coupling member by snap-in action into a circumferential groove in said female coupling member while remaining rotatable relative thereto.

21. An arrangement according to claim 20, characterized in that said latching member is made from stamped-out flat sheet-metal material.

22. An arrangement according to any one of claims 19, 20, or 21, characterized in that said latching member consists of a substantially flat sheet-metal part in one plane for male connecting members of relatively smaller outside diameter and of a substantially flat sheet-metal part of approximately L-shape for male connecting members of relatively larger outside diameter so as to accommodate connecting members of relatively larger outside diameter with substantially the same outside dimensions of the female coupling member.

23. An arrangement according to claim 22, characterized in that the relatively flat sheet-metal part inserted into said one cutout portion is provided with an approximately V-shaped notch in its trailing edge, as viewed in the inserting direction of the male connecting member, and with an approximately flattened U-shaped cutout in its leading edge.

24. An arrangement according to any one of claims 19, or 20, characterized in that the locking arrangement includes only the three parts of latching member, spring and rotatable cap means devoid of any mechanical connection therebetween.

25. An arrangement according to claim 24, characterized in that said latching member consists of a substantially flat sheet-metal part in one plane for male connecting members of relatively smaller outside diameter and of a substantially flat sheet-metal part of approximately L-shape for male connecting members of relatively larger outside diameter so as to accommodate connecting members of relatively larger outside diameter with substantially the same outside dimensions of the female coupling member.

26. An arrangement according to claim 25, characterized in that the relatively flat sheet-metal part inserted into said one cutout portion is provided with an approximately V-shaped notch in its trailing edge, as viewed in the inserting direction of the male connecting member, and with an approximately flattened U-shaped cutout in its leading edge.

* * * * *